United States Patent [19]
Julian

[11] Patent Number: 5,183,293
[45] Date of Patent: Feb. 2, 1993

[54] WASTE MANAGEMENT SYSTEM

[76] Inventor: Vincent D. Julian, 220 Crusader, Murray, Utah 84107

[21] Appl. No.: 704,375

[22] Filed: May 23, 1991

[51] Int. Cl.$^5$ ............................................. B60P 3/00
[52] U.S. Cl. ........................................ 280/430; 4/449; 4/458; 4/460; 298/24; 414/419; 414/436
[58] Field of Search ............... 280/830; 4/449, 458, 4/114.1, 460, 461; 298/24; 296/171, 174, 176; 414/436, 419

[56] References Cited

U.S. PATENT DOCUMENTS

| | | | |
|---|---|---|---|
| 743,834 | 11/1903 | Danner | 4/461 |
| 2,772,420 | 12/1956 | Carter | 4/458 |
| 4,305,164 | 12/1981 | Sargent et al. | 4/460 |

Primary Examiner—Mitchell J. Hill
Attorney, Agent, or Firm—M. Reid Russell

[57] ABSTRACT

A waste management system for handling both solid and human waste consisting of a trailer with a hitch arrangement for connection to a towing vehicle. The trailer preferably includes tandem axles that support a trailer frame whereto a trash collecting bin is pivotally mounted, with that bin to tilt so as to dump rearwardly. The pivoting trash bin is maintained in an upright attitude to receive trash through a top thereof, and will gravity dump, when released, and further includes a linkage that is operated to move a friction wheel into engagement with one of the trailer wheels for turning a take-up drum. The take-up drum, when turned, to reel in a cable that is passed through a take-up pulley is secured between the trash bin, and the trailer frame. By operating the linkage, trailer forward travel will provide for pivoting the trash bin back to an upright attitude. The invention also includes one or a pair of chemical toilets that are releasably maintained onto the trailer bed, forward of the pivoting trash bin. The chemical toilets are essentially conventional except that are arranged to gravity drain through a common line. A railing is provided around the trailer nose end that is open above a folding step for use by a person climbing the trailer bed.

8 Claims, 2 Drawing Sheets

WASTE MANAGEMENT SYSTEM

BACKGROUND OF THE INVENTION

1. Field of the Invention

This invention relates to trailer mounted waste disposal systems to be pulled behind a prime mover vehicle, and particularly to collection systems for collecting and transporting for disposal both trash and human waste.

2. Prior Art

In the mobile society that the citizens of the United States enjoy it is usual for people to utilize their leisure time in recreational travel. It is common for mountain and desert areas to receive an inflow of high concentrations of people on weekends and holidays. This situation is increasingly the case even in very remote areas, and it is a truism that where people go they leave their trash and refuse behind. Government authorities charged with keeping such remote areas clean have attempted to meet this condition with appropriate placement of trash containers and portable toilets. In practice, however, such often become full to overflowing before they can be emptied, particularly in remote areas. Often the anticipated need does not meet the actual human concentrations, requiring relocation to actual areas of use. For heavy containers and portable toilets, such relocation to meet actual need can be a problem. Similarly, it is not usual to experience a temporary requirement to handle a large volume of trash and human waste in a remote area for a relatively short period of time. As, for example, military exercises.

To meet such needs as set out above, the present invention provides a versatile combination of a trash container and chemical toilet, both mounted on a light trailer that is easily moved from and to a remote area. Which trash container is pivotally mounted to be gravity dumped, and is easily restored to its upright trash receiving attitude by a linkage operated by turning the trailer wheels, with the chemical toilet arranged to be conveniently gravity drained.

A presently pending U.S. patent application of the present inventor, application Ser. No. 07/495,401, entitled Apparatus for Handling Trash filed Mar. 19, 1990, issued on Aug. 13, 1991 as U.S. Pat. No. 5,039,271, shows a combination of a trailer mounted dumping container and linkage for returning the container to an erected attitude by turning the trailer wheels. The present combination is however not taught by this earlier application.

Certainly dumping trailer configurations and even dumping trash bin arrangements are not new, and Additional to the above set out patent application, U.S. Pat. Nos. 1,322,595; 1,606,234; 2,059,818; 2,964,204; 3,092,273; 3,189,387; 3,891,106; 4,394,105; 4,711,499; and 4,802,709, involve trash handling and trailer arrangements. None of which, however, show the combination of the present invention.

SUMMARY OF THE INVENTION

It is therefore a principal object of the present invention in a waste management system to provide a trailer mounted combination of a dumping trash containing bin and linkage for erecting it to a trash receiving attitude by turning the trailer wheels, and further including at least one portable chemical toilet arranged on the trailer.

Another object of the present invention is to provide a combination of a dumping trash containing bin and chemical toilet or toilets mounted, both on a trailer that includes a pivoting step accessing a flat trailer bed for providing convenient access to the chemical toilets.

Another object of the present invention is to provide for supporting the standard chemical toilet or toilets on the trailer bed.

Still another object of the present invention is to provide an arrangement for conveniently gravity draining the trailer mounted chemical toilet or toilets.

Still another object of the present invention is to provide a portable trash collecting system and chemical toilet arrangement that are arranged on a trailer to be movable to a location for use and can be easily removed therefrom for dumping and relocation.

The present invention is in a combination of a pivoting trash collecting bin with self-contained chemical toilets that are mounted onto a trailer for convenient movement to a remote area. The trailer is preferably a tandem axle trailer that includes a flat bed and an arrangement for mounting the pivoting trash bin across a trailer rear end, and the pair of chemical toilets mounted on the flat bed across a middle portion.

The trailer includes a tongue that extends from its front end that mounts a contentional hitch for securing to a towing vehicle. The pivoting trash bin is mounted between stub axles across the trailer rear end and is maintained in an upright attitude as by a tether connecting the bin to the trailer frame. When filled, the bin is dumped by releasing the tether the bin pivoting to dump under the urgings of gravity. To erect the bin, a linkage is provided for engaging a drive wheel and take-up reel to a trailer wheel, turning of which trailer wheel winds cable onto the take-up reel that is connected to the bin to return that trash bin to an upright attitude.

At least one and preferably a pair of chemical toilets are arranged side-by-side across the trailer bed middle area, the chemical toilets facing rearwardly to open onto a flat area of the trailer bed arranged across the trailer nose or front portion. A railing is provided around the trailer nose or front end that is open to a pivoting step. The pivoting step is arranged for lowering into ground engagement, and can be folded onto the trailer bed for travel. Brackets are provided to mount the chemical toilets onto the trailer bed and spaced apart landing gears are arranged at intervals around the trailer nose, which landing gears are lowered into ground engagement, for supporting the trailer nose to allow removal of a towing vehicle.

Other objects and features of the invention will become apparent from the following detailed description and drawings disclosing what is presently contemplated as being the best mode of the invention.

THE DRAWINGS

DETAILED DESCRIPTION

Figure 2:
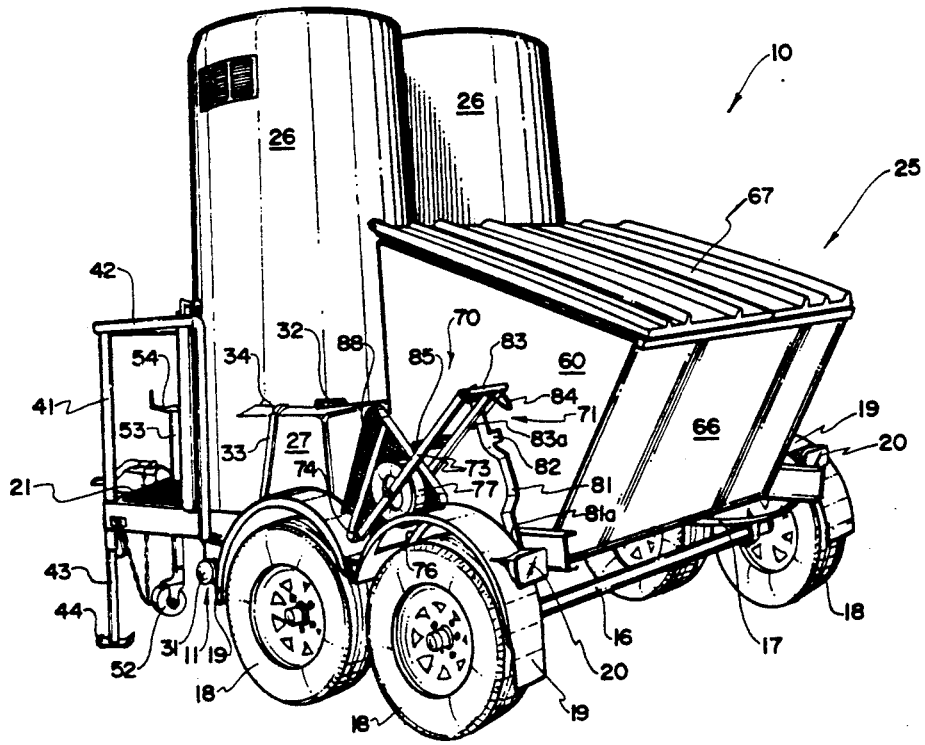
FIG. 2 is a perspective view like that of FIG. 1 taken from the rear and right side thereof.
Figure 4:
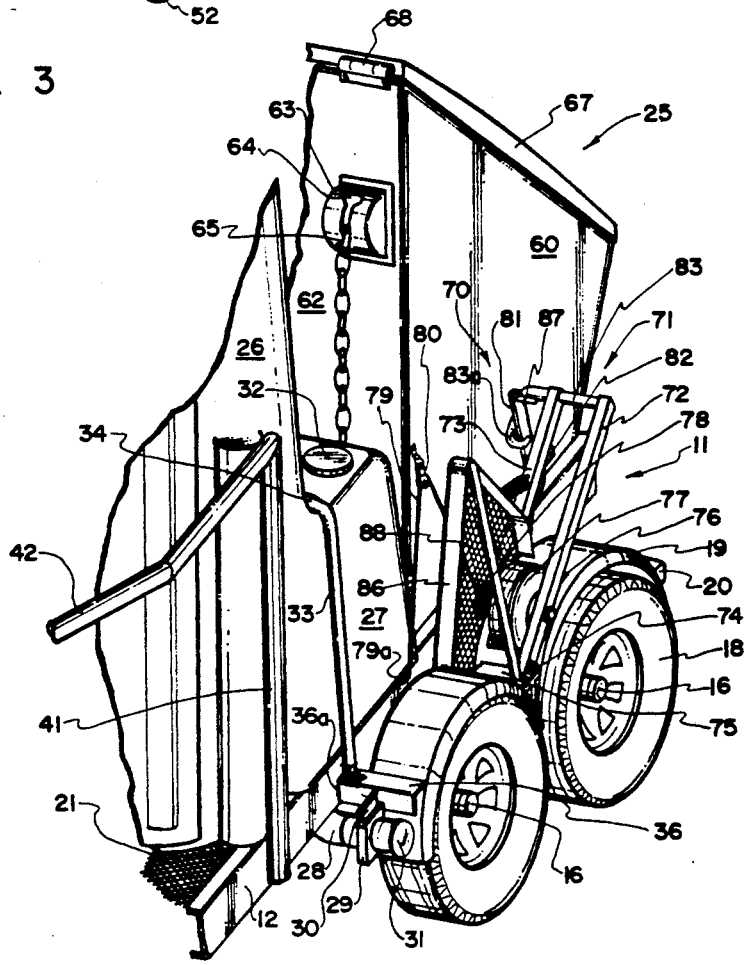
FIG. 4 is an expanded view of the right rear side of the waste management system of FIG. 2, showing a trash bin erecting drive wheel, take-up reel and linkage for engaging that drive wheel to one of the trailer wheels.

In the illustrated preferred embodiment of the invention, the waste management system, herein after referred to as system, is shown generally at 10. The system includes a trailer shown generally at Il, having a frame 12 that, as shown in FIG. 4, the frame 12 is preferably formed from channel sections formed in a boat shape that, as shown in FIG. 2 is open across a rear end with parallel side frame members that are bent inwardly towards one another into a trailer nose. A tongue 13 is shown extending forwardly from the nose junction of which frame members. The tongue 13 is shown herein as having a ring 14 secured to extend forwardly of its end that is for fitting over an upright post on a towing vehicle, not shown. Within the scope of this disclosure, the above described arrangement can be replaced with any other appropriate hitch arrangement as, for example, a lower plate of which tongue can include one or more standard hitch balls installed thereon that is or are for receiving a towing vehicle cup fitted thereto, not shown. Cross members are appropriately secured across the side frame members, not shown, for stiffening the frame 12 for both mounting an undercarriage thereto, shown as tandem axles, and for supporting the trailer bed and other components of the invention, as set out below.

The preferred undercarriage consists of tandem axles 16 that are supported, as shown in FIG. 2, at springs 17, and mount wheels 18 on the axle ends. The pair of axles 16 and pairs of wheels 18 provide a load supporting capability that is required for safe road travel. However, it should be understood that for some applications, as for example a single portable toilet, a single axle undercarriage could be employed within the scope of this disclosure. For travel over the public roads the frame 12 includes fenders 19 arranged over the wheels 18 and brake lights 20 mounted on which fenders to face rearwardly.

A pivoting trash containing hopper or bin 25, hereinafter referred to as bin, is shown pivotally mounted across the trailer rear end, between the side frame members, to dump rearwardly. Forward of the bin 25, the frame 12 is shown covered with a bed that is shown as a section of metal mesh, as the trailer bed 21. Obviously, another covering, as for example, a solid metal plate, can be connected across the frame 12 to provide a rigid supporting surface within the scope of this disclosure. Forward of a bin forward wall 62, and adjacent thereto, are shown a pair of chemical toilets 26 supported on the trailer bed 21.

Figure 3:
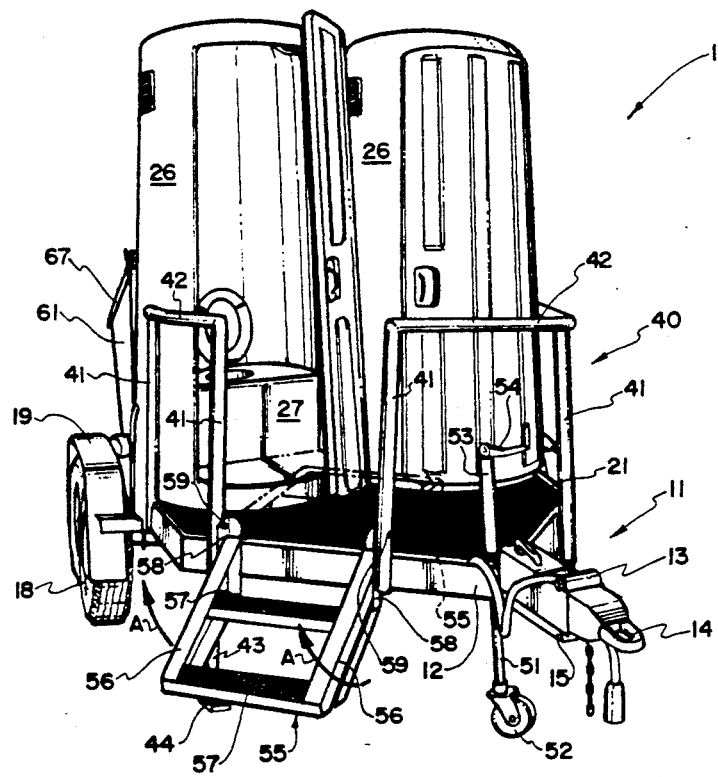
FIG. 3 is a perspective view of the waste management system taken from the front and left side there, showing with arrows the upward pivoting of a step to a stowed attitude, shown in broken lines.

The chemical toilets 26 are essentially standard chemical toilets and a chemical toilet manufactured by Superior Fiber Glass, of Salt Lake City, Utah has been successful utilized for this application. Such chemical toilet includes, as shown in FIGS. 3 and 4, a holding tank 27 for receiving and holding both solid and liquid human waste. Unique to the present invention, a bottom drain is fitted to each chemical toilet, draining through a tee into a line 28, shown in FIGS. 1 and 4. Line 28 extends beyond the side of one of the chemical toilets 26 and terminates in a gate valve 29. The gate valve 29, is shown as including a vertically movable plate 30 that, when lifted, opens the line 28 to pass gravity flow materials held in the holding tank therethrough. An end cap 31 is provided for closing the end of line 28, beyond the gate valve 29. A vent 32 is also provided on the top of the holding tank 27, as shown best in FIG. 4, that is molded into the holding tank for providing venting, as required.

Figure 1:
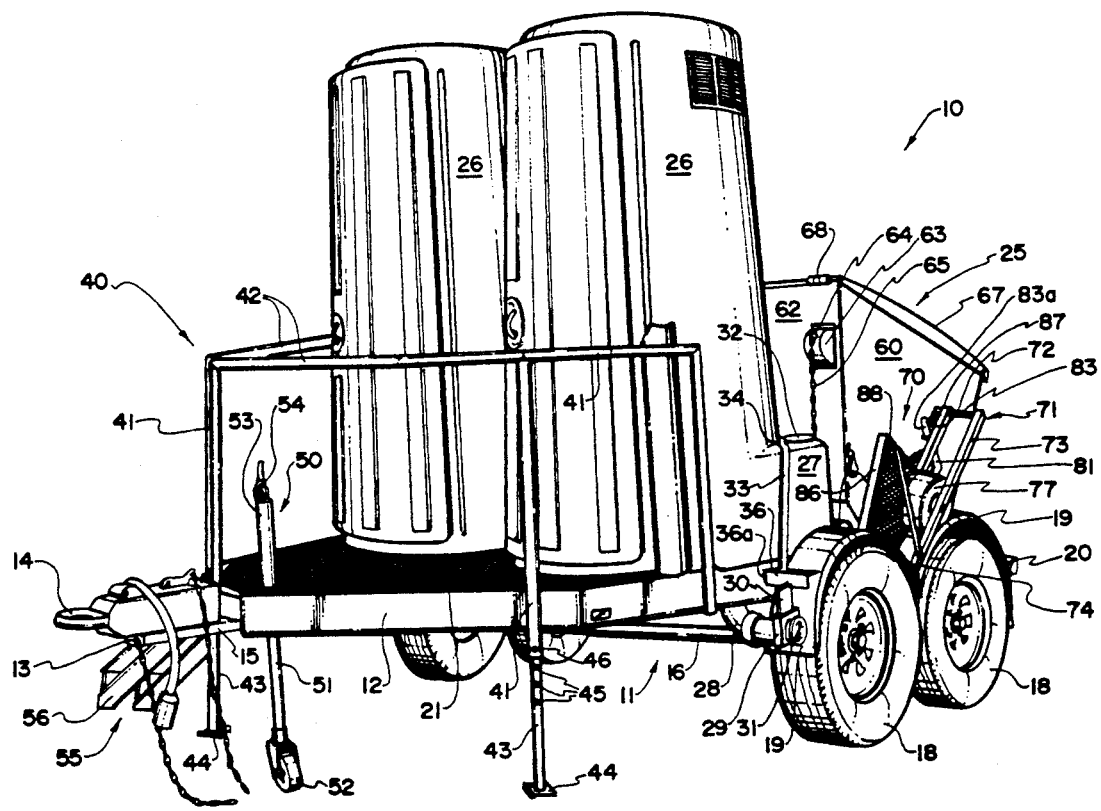
FIG. 1 is a perspective view of the waste management system of the present invention taken from the front and right side thereof.
Figure 5:
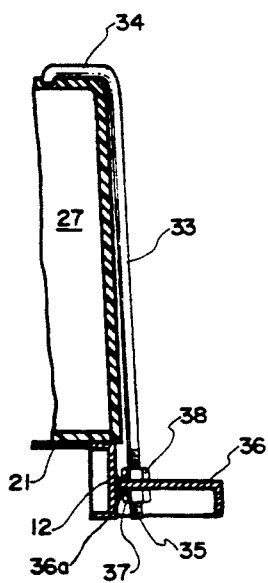
FIG. 5 is an expanded sectional view taken within the line 5—5 of FIG. 4.

FIGS. 1, 4 and 5, show a J-rod 33 that is for releasably mounting the chemical toilet 26 onto the trailer bed 21. A curved or hooked end 34 of the J-rod 33 is shown best in FIG. 5 fitted over the holding tank 27 top edge, and a threaded end 35 of which J-rod is shown passed through a hole that is formed through an angle bracket 36. Which angle bracket is secured at its end 36a to extend at a right angle outwardly from the side of a channel frame section. Shown best in FIG. 5, a bottom nut 37 is turned onto the rod threaded end 35, beneath the bracket 36, and a top, or lock nut, 38 is turned on the rod threaded end against the top of angle bracket 36, rigidly securing the J-rod to which angle bracket, and holding the chemical toilet 26 onto the trailer bed 21.

A guard railing 40 is provided around the trailer 11 forward end, which guard railing, as shown in FIG. 3, is open at a left side to facilitate a person climbing onto the trailer bed 21. The guard railing includes vertical or upright members 41 that are secured on their lower ends of the frame 21, and include top or horizontal members 42 extending across the tops thereof. Vertical or upright members 41 that are adjacent of the inward bends of the frame members, as shown best in FIG. 1, extend downwardly below the frame 12 as outer sleeves for receiving telescoping rods 43 fitted therein. The telescoping rods 43 each mount a foot 44 across their lower end. Also, the telescoping rods 43, shown best in FIG. 1, each include spaced apart holes 45 formed therethrough and a hole 46 is provided through the lower end of each upright member 41, one of which holes 45 to align with hole 46 to receive a pin, not shown, fitted therethrough when the foot 44 is in ground engagement, serving as landing gears. Also, a screw type landing gear 50 is provided at the trailer nose that consists of a telescoping rod 51 that mounts a wheel 52 journaled across a lower end thereof, which rod 51 telescopes into a sleeve 53 that is secured to extend vertically from the trailer frame 12. A handle 54, that is shown across the sleeve top end, is connected to turn the telescoping rod 51 into or out of the sleeve 54. Thereby, the wheel is lowered into ground engagement, or is elevated out of ground engagement, as when a towing vehicle is connected to tow the trailer 11.

As set out above, the guard rail 40 includes an opening to allow for access onto the trailer bed 21. To facilitate such access a folding step 55 is provided at that opening. The folding step consists of a pair of parallel side rails 56 with spaced treads 57 extending therebetween. Brackets 58, that extend upwardly, are attached to the top ends of which side rails, the brackets including holes to receive pins 59 that are fitted therethrough and through holes in the adjacent vertical or upright member 41, forming a pivot mounting of the folding step 55 to the frame 12. Arrows A, as shown in FIG. 3, illustrate the upward rotation of the folding step 55 onto the trailer bed, as for travel, which folded attitude is illustrated in broken lines.

A pivoting trashing containing hopper or bin 25, hereinafter referred to as bin 25, is set out herein above as being pivotally mounted across the rear end of trailer 11. Bin 25 and its mounting to trailer is substantially like that shown and described in the currently pending U.S. patent application Ser. No. 07/495,401, entitled, "Apparatus for Handling Trash" of the present inventor. Accordingly, it should be understood that bin 25, like the arrangement of my earlier patent application, is mounted between aligned stub axles that are in turn secured to opposite frame sides. The stub axles, not shown herein, are aligned across from one another, extending outwardly from the bin sides 60 and 61, respectively, as shown in FIGS. 1 through 4. Stub axle placement is such that the center of gravity of the bin will be rearward, or towards the trailer rear end, the bin 25 to dump under the urgings of gravity when released. To retain the bin 25 in an upright position for receiving trash a bracket 63, as shown best in FIG. 4, is mounted to the bin forward wall 62. A keyway 64 is provided into which bracket 63 is to receive an end of a chain 65, the other end of which chain is secured to the frame 12. An arrangement is thereby provided for releasably maintaining the bin 25 in an upright attitude. When the bin 25 is dumped, a bin rear wall 66 moves towards the ground. In that travel, a bin lid 67, that is connected by hinges 68 to a top edge of the bin forward wall 62, pivots off of its covering attitude across the bin top, allowing materials collected in that bin to dump onto the ground.

The present invention employs a lift mechanism like that of the aforementioned patent application of the present inventor in an "Apparatus for Handling Trash". Accordingly, the bin 25 includes a lifting mechanism 70, that is shown in FIGS. 1, 2 and 4, for erecting the bin 25 from a dump attitude by a forward turning of the trailer wheel 18. Lift mechanism 70 includes a pivoted actuator frame 71 formed from a pair of spaced apart legs 72 and 73. Legs 72 and 73, as shown best in FIG. 4, are pivotally connected at their ends 74, respectively, to a brace 75 that extends from the trailer frame 12 and whereto a pair of the fenders 19 are secured. A rear most fender 19 is shown as having had a rectangular opening 76 formed therethrough, for passing a friction wheel 77 turned therein. Shown best in FIG. 4, a take-up reel 78 is fixed axially to the friction wheel 77 to turn therewith and the assembly is journaled through the legs 72 and 73. So arranged, turning of the friction wheel 77 is provided by moving it into engagement with the trailer wheel 18 to turn also the take-up reel 78 whereover a cable 79 is wound. The cable 79 is shown passed through a pulley 80 that is secured to the bin side 60, proximate to the forward wall 62, and the other cable end 79a is secured to the frame 12. As the bin 25 pivots on release of chain 65 the cable 79 is reeled off of the take-up reel 78. Whereafter, when the friction wheel 77 is moved into engagement with, and is turned by the trailer wheel 18, that cable is wound up on that reel, shortening the cable through pulley 80, and pivots the bin 25 back to an erected trash receiving attitude.

The lifting mechanism 70 provides for moving the friction wheel 77 into engagement with the trailer wheel 18. Which lifting mechanism further includes a lever arm 81 that is rigidly connected at its lower end 81a to the trailer frame 12. Shown in FIGS. 2 and 4, the lever arm 81 includes a rearwardly projecting lug 82 that is to receive a V bend formed at a mid-point of a cable 84 whose ends are secured at spaced intervals along a cross bar 83. Which cross bar 83 is shown secured across the top ends of spaced legs 72 and 73. The cable 84, at its V mid-point hooks fits over the lug 82, releasably connecting the lift mechanism 70 to the lever arm 81. So arranged, the friction wheel 77 will be maintained in engagement to turn with the trailer wheel 19. A coil spring 85 is shown connected at its ends between the lift mechanism 70, leg 73 and a frame 86 that is, in turn, secured to the trailer frame 12. The coil spring 85 is to apply a biasing to retain the cable 84, at its V bend, over the lever arm lug 82 until manually released. Release requires that the lift mechanism 70 be pulled against the coil spring 85 biasing, and the cable 84 pivoted out of engagement with the lug 82. With the cable 84 detached from the lug 82 a hook end 83a of the lift mechanism cross bar 83 is free to travel upwardly along the lever arm 81 until stopped by a pin 87 that extends at a right angle outwardly from the leg 73. So arranged, the lift mechanism 70 and lever arm 81 will be maintained together during travel.

A screen 88 is shown secured across the frame 86 to protect against rocks or the like being thrown up from the road during travel that could damage the lift mechanism as by wedging between the trailer wheel 19 and friction wheel 77. Further, while not shown, it should be understood that the individual chemical toilets 26 are each preferably held on the trailer bed 21 by a pair of the described J-rods 23, each having its hook end 34 tightened onto the chemical toilet tank 27, with its treaded end secured to frame brace 36, and to a brace that is attached to a cross member of the trailer frame 12, not shown.

Although a preferred form of my invention in a waste management system has been shown and disclosed herein, it should be understood that the present disclosure is made by way of example only and that variations are possible without departing from the subject matter coming within the scope of the following claims and a reasonable equivalency thereof, which subject matter I regard as my invention.

I claim:

1. A waste management system comprising, a trailer having a frame with a bed covering a forward end thereof, which frame is supported on a trailer axle system whereto are journaled trailer wheels, and includes a neck as a forward trailer end with a landing gear means extending therefrom for ground engagement; means for coupling the forward end of said neck to a towing vehicle; a trash bin; means for pivotally mounting said trash bin to said trailer frame across a rear frame end to provide for trash bin rotation to a ground engaging attitude; means for maintaining the trash bin in an upright attitude relative to the trailer frame; a self contained chemical toilet; means for releasably mounting said chemical toilet onto said trailer frame; gravity drain means connected to a holding tank of said chemical toilet for draining said chemical toilet by gravity; and step means pivotally mounted to said trailer frame to pivot from a ground engaging attitude to a stowed attitude on the trailer bed.

2. A waste management system as recited in claim 1, wherein the trailer frame includes a pair of spaced apart channels that are parallel at a trailer frame rear end and are bent toward one another at approximately mid-points of each, forming at a forward end the trailer nose; and the trailer bed is a metal mesh that is attached between the spaced channels at the trailer forward end.

3. A waste disposal system as recited in claim 1 wherein the trash bin includes a pair of axle means extending from opposite sides of which trash bin bottom that are each journaled into bearing means that are mounted to the trailer frame, said axle means positioned to said trash bin to be forward of a center of gravity of said trash bin.

4. A waste disposal system as recited in claim 1, wherein the means for releasably mounting said chemical toilet onto said trailer frame consists of at least one rod having a J-shaped hook at one end with the other rod end threaded, the hook end for fitting over the holding tank top edge of a chemical toilet and the threaded end for fitting though a bracket that extends from the trailer frame; and nut means for turning over said rod threaded end for securing said rod threaded end to said bracket.

5. A waste disposal system as recited in claim 1, further including a railing that is attached to the trailer frame, around the nose end, and consists of, spaced apart upright members with horizontal members spanning therebetween, which railing is open above the step means; and a pair of said upright members are tubes that are aligned across the trailer frame and open at their bottom ends, each to receive a smaller diameter second tube telescoped therein, which said second tube includes a foot that is attached across its lower end, which each said upright member and said second tube are holed appropriately to receive a pin for locking together when said foot is in a ground engaging attitude.

6. A waste disposal system as recited in claim 1, wherein the drain means is a tube that is connected at one end into the bottom of the chemical toilet holding tank; and a gate valve means is arranged across the tube opposite end.

7. A waste disposal system as recited in claim 1, wherein the step means consists of a pair of spaced parallel side rails that are each pivotally connected at their top ends to the trailer frame, with a plurality of spaced apart treads secured therebetween.

8. A waste disposal system as recited in claim 1, wherein two portable chemical toilets are mounted in side-by-side relationship, onto the trailer bed.

* * * * *